(12) United States Patent
Eckle et al.

(10) Patent No.: US 7,442,148 B2
(45) Date of Patent: Oct. 28, 2008

(54) METHOD FOR OPERATING THE DRIVE TRAIN OF A MOTOR VEHICLE

(75) Inventors: Ulrich Eckle, Donzforf (DE); Thomas Volz, Boeblingen (DE)

(73) Assignee: Daimler AG, Stuttgart (DE)

( * ) Notice: Subject to any disclaimer, the term of this patent is extended or adjusted under 35 U.S.C. 154(b) by 393 days.

(21) Appl. No.: 10/559,653

(22) PCT Filed: May 5, 2004

(86) PCT No.: PCT/EP2004/004757

§ 371 (c)(1),
(2), (4) Date: May 11, 2006

(87) PCT Pub. No.: WO2004/109161

PCT Pub. Date: Dec. 16, 2004

(65) Prior Publication Data

US 2006/0252598 A1    Nov. 9, 2006

(30) Foreign Application Priority Data

Jun. 5, 2003    (DE) ................. 103 25 354

(51) Int. Cl.
*B60W 10/04*    (2006.01)
*F16H 61/16*    (2006.01)
(52) U.S. Cl. .................. 477/115; 477/125; 477/92
(58) Field of Classification Search .............. 477/115, 477/116, 125, 126, 124, 107, 110, 111, 92, 477/182; 701/53, 54, 62
See application file for complete search history.

(56) References Cited

U.S. PATENT DOCUMENTS

| | | | |
|---|---|---|---|
| 5,411,450 A | 5/1995 | Gratton et al. | |
| 5,522,777 A * | 6/1996 | Baxter et al. | 477/109 |
| 6,263,995 B1 * | 7/2001 | Watson et al. | 180/248 |
| 6,579,208 B2 | 6/2003 | Oliveira et al. | |
| 7,288,040 B2 * | 10/2007 | Baasch et al. | 477/107 |

FOREIGN PATENT DOCUMENTS

| | | |
|---|---|---|
| DE | 42 30 989 A1 | 3/1994 |
| DE | 199 63 678 A1 | 10/1997 |
| DE | 198 49 494 C1 | 3/2000 |

(Continued)

OTHER PUBLICATIONS

International Search Report Dated Sep. 2, 2004 (nine (9) pages).

(Continued)

*Primary Examiner*—Roger Pang
(74) *Attorney, Agent, or Firm*—Crowell & Moring LLP

(57) ABSTRACT

In a method for operating a motor vehicle in the event of a shift of a power divider actuated by external force, before the commencement of the shift of the power divider, a control device reduces the torque at the shifting members involved in the shift. The vehicle transmission is an automatic transmission, and the reduction is achieved a clutch in the automatic transmission is opened. After the conclusion of the shift, a torque is permitted again at said shifting members, and the clutch is closed again. The vehicle driver can consequently execute a shift in the power divider merely by triggering a shift requirement.

7 Claims, 2 Drawing Sheets

FOREIGN PATENT DOCUMENTS

| | | |
|---|---|---|
| DE | 197 12 232 C2 | 9/2003 |
| DE | 102 46 298 A1 | 4/2004 |
| EP | 0 350 476 A2 | 1/1990 |
| EP | 0 947 739 A2 | 10/1999 |
| EP | 1 371 514 A1 | 12/2003 |
| GB | 2 304 835 A | 3/1997 |
| GB | 2304835 A * | 3/1997 |
| WO | WO 00/21812 | 4/2000 |
| WO | WO 2004/018250 A2 | 3/2004 |

OTHER PUBLICATIONS

European Office Action Dated Jan. 20, 2004 (three (3) pages).

\* cited by examiner

METHOD FOR OPERATING THE DRIVE TRAIN OF A MOTOR VEHICLE

BACKGROUND AND SUMMARY OF THE INVENTION

This application claims the priority of German patent application no. 103 25 354.8, filed Jun. 5, 2003 (PCT International Application No. PCT/EP2004/004757, filed May 5, 2004), the disclosure of which is expressly incorporated by reference herein.

The invention relates to a method for operating the drive train of a motor vehicle.

German patent document DE 42 30 989 A1 discloses a method for operating a drive train with a prime mover in the form of an engine, a manual shift transmission, and a power divider which is not power-shiftable and is actuated by external force. A clutch actuated by foot force is arranged between the prime mover and the manual shift transmission. The power divider is arranged downstream of the manual shift transmission and has actuating members that can shift from road travel to cross-country travel with a high step-up ratio. The actuating members of the power divider are activated by a control device in the form of central control electronics.

In order to execute a shift, the vehicle driver must trigger a shift requirement by opening the clutch and actuate a switch in the form of a preselection switch in the interior of the motor vehicle. This shift requirement is then implemented by a control device.

U.S. Pat. No. 5,411,450 A also discloses a method for operating a drive train, a prime mover, an automatic transmission and a power divider that is not power-shiftable and is actuated by external force. Before the commencement of a shift of the power divider, a forward gear clutch of the automatic transmission is opened and the force flux between the prime mover and the power divider is thus interrupted. The shift in the power divider can subsequently be carried out. After completion of the shift, the forward gear clutch is closed again.

UK patent Document GB 2 304 835 A likewise describes a method for operating such a drive train. In the event of a shift, and consequently a change in the step-up ratio of the power divider, a suitable gear is selected automatically in the automatic transmission.

European patent document EP 0 947 739 A2 describes a method for operating a group transmission of a commercial vehicle. An automated main transmission is followed by a range group. In the event of a required shift of the range group, a check is made as to whether a rotational speed of the prime mover after the shift is lower than a minimum rotational speed. If so, the shift is not executed.

International patent document WO 00/021812 A describes a motor vehicle with an automated shift transmission and a device for preventing unwanted movement of the motor vehicle. In the event of an interrupted force flux between the prime mover and driven vehicle wheels, the device is activated to prevent rolling of the motor vehicle, specifically opposite to the desired direction of travel.

One object of the invention is therefore to provide a method for operating a motor vehicle, which makes it possible to operate the motor vehicle comfortably.

This and other objects and advantages are achieved by the method according to the invention, in which when a shift requirement is generated for the power divider, torque of the shifting members involved in the shift is reduced automatically by a control device before commencement of the shift. The shift requirement may be for a change of a step-up ratio of the power divider, or for a changeover between two-wheel and four-wheel drive. It may be triggered by the vehicle driver, for example by the actuation of a switch in the interior. Alternatively to this, the requirement may be generated by a control device as a function of operating variables of the motor vehicle and of environmental variables.

The reduction of the torque of the shifting members, for example gearwheels, sliding sleeve and/or synchronizing bodies, is necessary, since a shift (in particular a deselection of the shifted gear) is possible in non-power-shift transmissions only when no torque, or a very low torque is transferred by the shifting members which are in engagement.

The reduction can take place by means of the controlled setting of the output torque of the prime mover (for example, to zero), or by separating the connection between the prime mover and the power divider.

After the torque reduction has taken place, the shift is carried out by a suitable activation of externally driven actuating members; that is, without the assistance of the vehicle driver. The actuating members may be designed, for example, as electric motors or hydraulic or pneumatic piston/cylinder units. After the shift is completed, the control device again permits a torque at the shifting members. For this purpose, the output torque of the prime mover is set again according to an instruction from the vehicle driver, or the connection between the prime mover and power divider is restored. The instruction from the vehicle driver is derived from a degree of actuation of a power actuating member, for example the position of an accelerator pedal.

The transmission may be a manual shift transmission or an automated transmission.

The transmission is designed as an automatic transmission. In order to reduce the torque of the shifting members, the control device opens a clutch, interrupting a force flux between the prime mover and power divider which is produced by means of a positive or frictional connection. In particular, the control device opens a clutch in the automatic transmission (clutch also being understood as meaning a break in the automatic transmission). To open the clutch, the control device activates actuating members of the automatic transmission in a suitable form. Alternatively to a clutch in the automatic transmission, for example when an automated gearwheel change transmission is employed, a starting clutch arranged between the prime mover and the automatic transmission may also be opened. As a result of the opening of the clutch, the power divider is no longer connected to the prime mover, so that the drive train is separated and is consequently free of torque.

After the conclusion of the shift, the control device restores the force flux by closing the clutch.

The automatic transmission may be designed, for example, as an epicyclic transmission, continuously variable transmission, double clutch transmission or automated gearwheel change transmission. The motor vehicle may have a separate control device for simultaneously controlling the prime mover, the automatic transmission and the power divider.

Consequently, the torque of the shifting members can be reduced with a high degree of reliability, and it also becomes possible to shift the power divider reliably. Particularly in the case of distortions in the drive train (such as may occur, for example, on cross-country trips), the reduction in the torque of the shifting members by influencing the output torque of the prime mover is highly unreliable.

The motor vehicle has an activatable (for example, electrohydraulic) brake system by which a braking torque can be applied to the motor vehicle, independently of a position of a brake pedal, as a result of the activation of actuating members by a control device.

The control device of the power divider monitors the speed of the motor vehicle (and/or variables derived therefrom) during a shift of the power divider. Derived variables are, for example, a difference between a current speed and a speed of the commencement of the shift, acceleration of the motor vehicle or a direction of travel.

Based on the result of the monitoring, the control device activates the brake system at least indirectly, for example, by sending a requirement for a braking torque to the control device of the brake system, which implements the requirement. After completion of the shift, any requirement is canceled and therefore any braking torque which may be present is reduced.

The shift of the power divider may take up a few (for example, three), seconds during which time, the driver train is separated. (That is, the prime mover is not connected to the driven vehicle wheels, so that no torque from the prime mover can act on the vehicle wheels.) During this time, unwanted and uncontrolled movements of the motor vehicle may occur, for example when the motor vehicle is operated on a slope. By the speed of the motor vehicle and any activation of the brake system being monitored, active influence can be exerted on the movement of the motor vehicle in spite of the open drive train. Consequently, an especially reliable operation of the motor vehicle is ensured, and uncontrolled operation of the motor vehicle is prevented.

Upon the occurrence of a shift requirement, the control device calculates a rotational speed of the prime mover which occurs after the shift, based on the current speed of the motor vehicle and the step-up ratio in the drive train after the shift a rotational speed of the prime mover which occurs after the shift. This is relevant only when the step-up ratio of the power divider changes during the shift. A shift is carried out in the automatic transmission or the shift requirement is suppressed as a function of the calculated rotational speed.

The control device determines, in particular, a permitted range of the rotational speed of the prime mover after the shift. The range may be stored, for example, in the control device, or it may be determined as a function of operating variables of the motor vehicle, (for example, the speed, and/or environmental variables, such as the slope of the road. If the rotational speed can be brought into such range by simultaneously shifting the automatic transmission, the shift of the automatic transmission and of the power divider is carried out. Very high step-up ratio jumps (for example of 2.6) may lie between step-up ratios of power dividers. This may correspond approximately to a shift from 2nd to 5th gear, for example, in the case of a 7-gear epicyclic transmission. Consequently, in the event of a shift in the power divider and a step-up ratio of the automatic transmission which remains the same, the rotational speed of the prime mover changes sharply, and consequently rapidly exceeds the permitted range. This sharp change in rotational speed can be counteracted by a simultaneous change in the step-up ratio of the automatic transmission. To stay with the example mentioned, in the event of the shift of the power divider into a cross-country gear (that is, into a lower step-up ratio, the step-up ratio jump of 2.6), the rotational speed of the prime mover can be kept virtually constant by simultaneously shifting the automatic transmission from 2nd to 5th gear.

If, even as a result of a simultaneous shift of the automatic transmission, the rotational speed of the prime mover would lie outside the permitted range after the shift, the shift of the power divider is suppressed.

Consequently, a large proportion of required shifts of the power divider can also be executed. At the same time, however, the prime mover is prevented from entering an unpermitted operating state (in which, for example the rotational speed is too low or too high) after the shift.

When the method according to the invention is employed, no actuation of a clutch by the vehicle driver is necessary in order to execute a shift of the power divider. Should the driver wish to execute a shift, however, he or she needs only to trigger a shift requirement, and operation of the motor vehicle consequently becomes simpler and more comfortable for the vehicle driver.

In addition, by virtue of the method according to the invention, it is possible that the control device can decide whether a shift is appropriate, trigger such a shift, and carry it out without intervention by the vehicle driver.

In an embodiment of the invention, during the shift of the power divider, the control device automatically reduces the output torque of the prime mover, in which case an instruction from the vehicle driver via the power actuating member is ignored. After completion of the shift, the control device again permits an increase in the output torque, and the instruction from the vehicle driver is implemented again. The decrease and increase in the torque may take place, for example, along ramps.

Consequently, the vehicle driver can continue to actuate the power actuating member during a shift of the power divider, without the rotational speed of the prime mover rising undesirably and unnecessarily when the drive train is open. (During closing of the clutch, the risen rotational speed would in most instances have to be reduced again.) The operation of the motor vehicle consequently becomes simpler and more comfortable.

According to another feature of the invention, the control device activates the brake system when a false direction of travel that is, opposite to the desired direction of travel is detected. This may be determined, for example, from by comparing the current direction of travel with a position of the selector lever of the automatic transmission or with the direction of travel of the commencement of the shift. The current direction of travel may be determined by means of suitable rotational speed sensors on the vehicle wheels. The control device activates the brake system, in particular, to the standstill of the motor vehicle and subsequently holds the motor vehicle up to the conclusion of the shift. In this case, when the motor vehicle is subsequently started, rolling opposite to the desired direction of travel can likewise be prevented. The function of what is known as a hill holder can thereby be implemented.

A false direction of travel may occur, for example, during a shift of the power divider when the motor vehicle is driving up a steep slope at low speed, because the driver, train is separated, and no drive torque from the prime mover acts on the motor vehicle. Due to the slope downforce, the motor vehicle is decelerated and, in the most unfavorable case, is accelerated opposite to the original direction of travel. The motor vehicle could move toward motor vehicles which may possibly be following it. By activating the brake system, the unwanted movement can be prevented, and therefore safety-critical situations can be prevented. This makes it possible to operate the motor vehicle particularly reliably.

In an embodiment of the invention, the control device activates the brake system if a difference of the current speed from an initial speed at the commencement of the shift and/or a speed gradient, overshoot limit values. In particular, by means of a suitable braking torque, a constant differential speed or a constant speed gradient (that is, a constant acceleration), can be set.

This prevents the the vehicle speed from increasing too sharply during a shift of the power divider, such as might arise, for example, if a shift occurs when the motor vehicle is driving down a steep slope. That is, with the drive train separated, there is also no engine braking action on the motor vehicle, which may lead to a sudden sharp acceleration of the motor vehicle. Such acceleration may be very surprising to the vehicle driver, and may therefore lead to a safety-critical driving situation. By activating the brake system when one of the conditions mentioned is fulfilled, the safety-critical driving situations described cannot arise, thus resulting in a particularly reliable operation of the motor vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
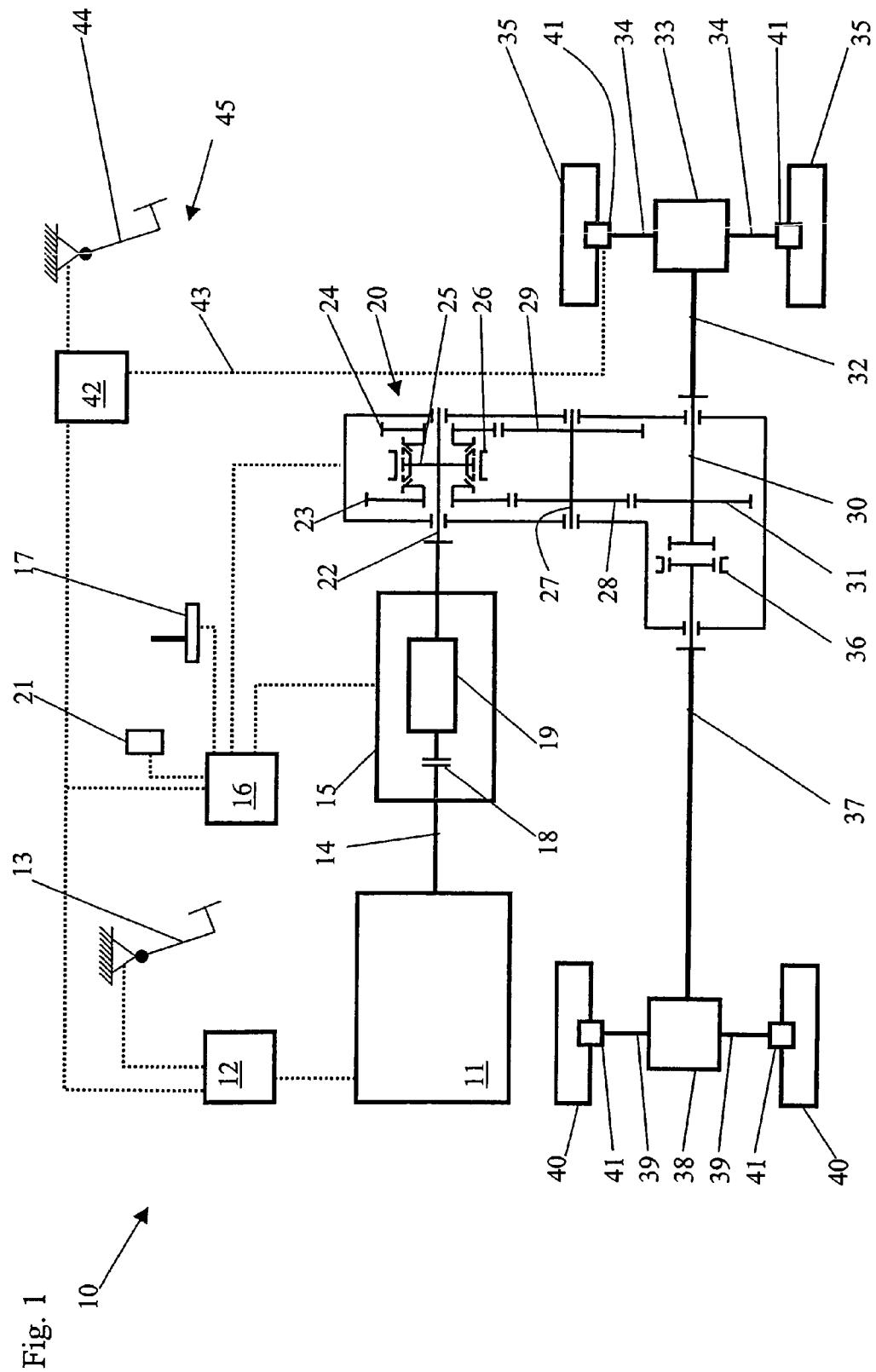
FIG. 1 shows a detail of a drive train of a motor vehicle with a power divider.

Referring to FIG. 1, a drive train 10 of a motor vehicle (not illustrated) has an internal combustion engine 11 which is activated by a control device 12. For this purpose, the control device 12 is signal-connected to actuating members (not illustrated), such as, for example, a throttle valve adjuster, and sensors, such as, for example, rotational speed sensors. Moreover, the control device 12 is signal-connected to a power actuating member 13 for example, an accelerator pedal) by which a vehicle driver can set an output torque of the internal combustion engine 11. The control device 12 can calculate from detected variables further operating variables of the internal combustion engine 11, for example the output torque of the internal combustion engine 11.

The internal combustion engine 11 is connected via a shaft 14 to designed as a 7-gear automatic epicyclic transmission 15, and which is activated by a control device 16. For this purpose, the control device 16 is signal-connected to actuating members (not illustrated), such as for example, electromagnetic valves for the actuation of clutches and brakes, and sensors, such as rotational speed sensors. Moreover, the control device 16 is signal-connected to a selector lever 17, by which the vehicle driver can set a driving step of the automatic transmission 15 (for example, "D" for forward drive, "N" for a neutral position or "R" for reverse drive).

In the automatic transmission 15, a clutch 18 is illustrated, which represents a plurality of clutches and brakes in the automatic transmission 15, which act on elements of planet sets, such as a sun, web and ring wheel. A block 19 represents a plurality of planet sets, by which the various step-up ratios of the automatic transmission 15 can be implemented. Such clutches and brakes serve for setting the step-up ratios. As a result of the opening of the clutch 18 or even of more than one clutch or brake, the control device 16 can separate the force flux in the automatic transmission 15.

A power divider 20 which is arranged downstream of the automatic transmission 15 is likewise activated by the control device 16. The power divider 20 has two different step-up ratios via a road gear and cross-country gear. Moreover, a changeover can be made in the power divider between two-wheel and four-wheel drive. For this purpose, the power divider 20 has actuating members (not illustrated), which are activated by the control device 16. In addition, the control device 16 is signal-connected to an operating unit 21, by which the vehicle driver can trigger shift requirements for the power divider 20 (for example, a changeover from the road gear to the cross-country gear).

Two loose wheels 23 and 24 having a different diameter are arranged rotatably on an input shaft 22 of the power divider 20. In each case a loose wheel 23, 24 can be connected fixedly in terms of rotation to the input shaft 22 by means of a synchronizing body 25 and a sliding sleeve 26 which are arranged fixedly in terms of rotation on the input shaft. For this purpose, the sliding sleeve 26 can be displaced in the axial direction of the input shaft 22 by means of an actuating member (not illustrated). The loose wheels 23 and 24 mesh with associated fixed wheels 28 and 29 arranged fixedly in terms of rotation on an intermediate shaft 27. The fixed wheel 28 meshes with a fixed wheel 31 arranged fixedly in terms of rotation on an output shaft 30. The road gear is set by connecting the loose wheel 23 to the input shaft 22 and the cross-country gear with a higher step-up ratio is set by the loose wheel 24 being connected to the input shaft 22.

The output shaft 30 is connected by means of a rear drive shaft 32 to a rear-axle transmission 33 which in a known way transfers the output torque of the internal combustion engine 11 to rear vehicle wheels 35 via rear side shafts 34.

Arranged on the output shaft 30 of the power divider 20 is a shifting device 36, by means of which the output shaft 30 can be coupled to a front drive shaft 37. The output shaft 30 can consequently be connected to a front-axle transmission 38 which in a known way can transfer the output torque of the internal combustion engine 11 to front vehicle wheels 40 via front side shafts 39.

The shifting device 36 can be actuated by means of an actuating member (not illustrated).

Consequently, the shifting device 36 can effect a changeover between two-wheel and four-wheel drive by the control drive 16.

Braking devices 41 which are activated by a control device 42 are arranged on the vehicle wheels 35, 40. (For the sake of clarity, only one signal line 43 is illustrated; moreover, while the braking devices 41 are designed electrohydraulically, the necessary hydraulic lines also not illustrated.) The control device 42 is signal-connected to a brake pedal 44, by which the vehicle driver can set the braking torque applied by the braking devices 41, and consequently acting on the motor vehicle. For this purpose, the position of the brake pedal 44 is detected by means of a sensor (not illustrated), and is transferred to the control device 42 which then activates the braking devices 41 correspondingly. However, the control device 42 may also activate the braking devices 41 independently of the position of the brake pedal 44, for example at the requirement of the control device 16. The motor vehicle consequently has a brake system 45 which comprises at least the braking devices 41, the control device 42 and the brake pedal 44.

Rotational speed sensors (not illustrated), by means of which the control device 42 can detect a rotational speed and a direction of rotation (forward or backward) of the vehicle wheels 35, 40, are integrated in the braking devices 41. The speed and acceleration of the motor vehicle can be determined from these rotational speeds.

The control devices 12, 16 and 42 are signal-connected to one another via a serial bus connection (for example via a CAN bus). Consequently, detected variables, such as, rotational speed and direction of rotation of the vehicle wheels 35 and 40, can be exchanged, or requirements can be sent to a control device; for example, the setting of a specific braking torque can be sent by the control device 16 of the automatic transmission 15 and of the power divider 20 to the control device 42 of the braking devices 41. The braking devices 41 are in this case activated at least indirectly by the control device 16.

The power divider may also be integrated into the automatic transmission.

The power divider may also have a longitudinal differential.

Figure 2:
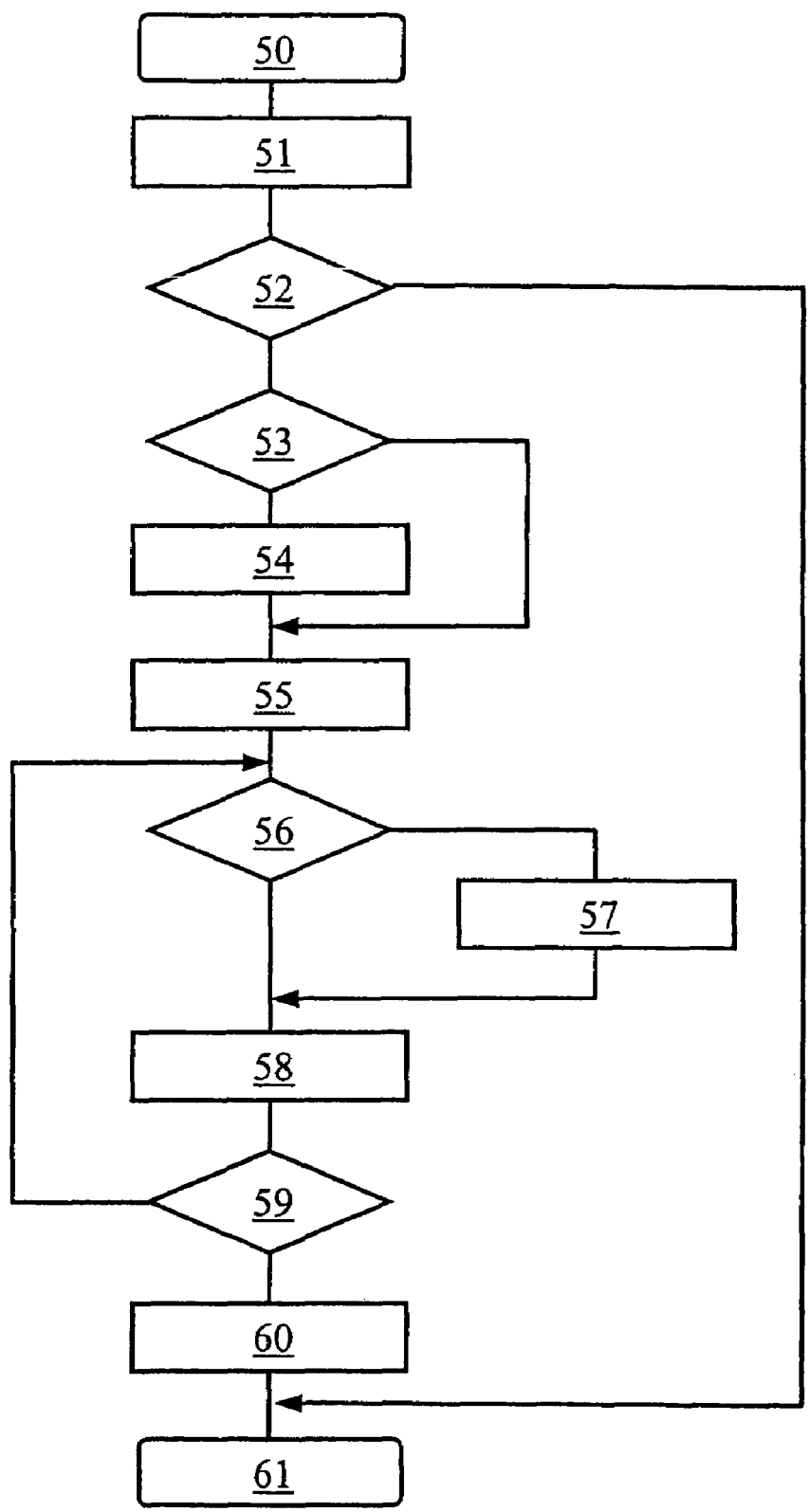
FIG. 2 shows a flowchart of a method for operating the motor vehicle in the event of a shift of the power divider.

FIG. 2 is a flow chart that illustrates a method for operating the motor vehicle in the event of a shift of the power divider 20. The method, which is processed by the control device 16, commences in block 50 with a requirement for a shift, for example from road gear to cross-country gear.

In the following block 51, by means of the current speed and step-up ratios in the drive train 10, the rotational speed of the prime mover 11, established without any shift in the automatic transmission 15, is determined in the gear to be selected. To increase the accuracy of the calculation, the speed of the motor vehicle at the conclusion of the shift may be precalculated from a stored duration of the shift, the current speed, the current acceleration and known driving resistances caused, for example, by a rolling resistance or a slope.

The following interrogation block 52 determines whether the required shift can be carried out. For this purpose, a check is first made whether the rotational speed calculated in block 51 lies within a permitted range. (In a method which is not illustrated, the permitted range is likewise determined by the control device 16 as a function of operating variables of the motor vehicle and environmental variables.) If the rotational speed lies outside the permitted range, in a second step a check is made whether the rotational speed of the prime mover 11 can be brought into the permitted range by a corresponding shift of the automatic transmission 15. Hence, for example in the case of a shift to cross-country gear, by means of an upshift of the automatic transmission 15 from 2nd to 4th gear.

If the result of the check is negative, the required shift cannot be executed, and therefore the requirement is suppressed and the method is terminated in block 61.

If the check in interrogation block 52 has a positive result, the method is continued in interrogation block 53. It may be mentioned, at this juncture, that, in all the interrogation blocks in FIG. 2, the method is continued according to the downward output of the interrogation block in the case of a positive result of the check and according to the lateral output in the case of a negative result.

In interrogation block 53, based on the results of interrogation block 52, a check is made whether a shift of the automatic transmission 15 is necessary. If so, the corresponding shift is triggered in block 54. The method may even be processed further before the shift in the automatic transmission 15 is concluded. The shift in the automatic transmission 15 is independent of the further processing of the method.

After block 54, block 55 is processed. If no shift is necessary, then block 55 is processed immediately after interrogation block 53. In block 55, the force flux between the prime mover 11 and power divider 20 is interrupted by a suitable activation of the clutches and brakes in the automatic transmission 15. At the same time, the output torque of the prime mover 11 is reduced independently of the position of the power actuating member 13.

In the following interrogation block 56, in a first step, a check is made whether the direction of rotation of the vehicle wheels 35, 40 coincides with the desired direction of rotation which the vehicle driver sets by means of the selector lever 17. In a second step, a check is made whether, in the case of a correct direction of rotation, a difference between the current speed and the speed of the commencement of the shift is lower than a limit value.

If one of the interrogations delivers a negative result, then, in block 57, the brake system 45 is activated and consequently a braking torque is built up. In the case of a false direction of rotation of the vehicle wheels 35, 40, the motor vehicle is braked to a standstill, and, if the differential speed is too high, a constant speed difference is set.

After the processing of block 57 or if both interrogations in block 56 deliver a positive result, the shift in the power divider 20 is executed in block 58. After a fixed cycle time (for example, 10 ms), a check is made in interrogation block 59 whether the shift is already concluded. If not, the method jumps back to interrogation block 56. The direction of rotation and the speed are therefore constantly checked during the shift.

When the shift is completed, in block 60 the force flux in the automatic transmission 15 is restored by closing the corresponding clutches. In addition, a torque corresponding to the instruction from the vehicle driver is set again on the prime mover 11. If the brake system 45 has been activated in block 57, the built-up braking torque is at the same time reduced again. The shift is consequently concluded.

The method is terminated in the following block 61.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating the drive train of a motor vehicle, having a prime mover, an automatic transmission, a power divider actuated by external force and not power-shiftable, and at least one control device for activating the prime mover, the automatic transmission and the power divider; wherein:

a shift is executed by the control device in the presence of a shift requirement for the power divider;

before the commencement of the shift, the control device reduces torque at shifting members involved in the shift by interrupting the force flux between the prime mover and power divider, by the opening a clutch in the automatic transmission;

after completion of the shift, the control device restores the force flux by closing of said clutch and permitting a torque again at said shifting members;

the motor vehicle has an activatable brake system;

the control device monitors at least one of i) speed of the motor vehicle and ii) variables derived from the vehicle speed during a shift of the power divider;

the control device activates the brake system as a function of the result of the monitoring; and, in the presence of a shift requirement, the control device calculates a rotational speed of the prime mover after the shift and carries out a shift in the automatic transmission or suppresses the shift requirement as a function of the calculated rotational speed.

2. The method as claimed in claim 1, wherein the control device reduces an output torque of the prime mover during the shift, and permits an increase in the output torque after conclusion of the shift.

3. The method as claimed in claim 1, wherein if a false direction of travel is detected, the control device activates the brake system of the motor vehicle.

4. The method as claimed in claim 3, wherein said brake system causes a standstill of the motor vehicle.

5. The method as claimed in claim 1, wherein if one of i) a difference of the current speed from an initial speed at commencement of a shift, and ii) a speed gradient, overshoot limit values, the control device activates the brake system.

6. The method as claimed in claim 5, wherein the control device sets a constant differential speed or a constant speed gradient.

7. The method as claimed in claim 1, wherein:

the control device determines a permitted range of the rotational speed of the prime mover after the shift;

if the rotational speed can be brought into said range by means of a shift of the automatic transmission, a the shift of the automatic transmission and of the power divider is carried out; and otherwise, a shift of the power divider is suppressed.

\* \* \* \* \*